March 31. 1925.
J. B. BRINSMADE
1,531,593
MOUNTING FOR AERIAL CAMERAS
Filed Aug. 1, 1921 3 Sheets-Sheet 1
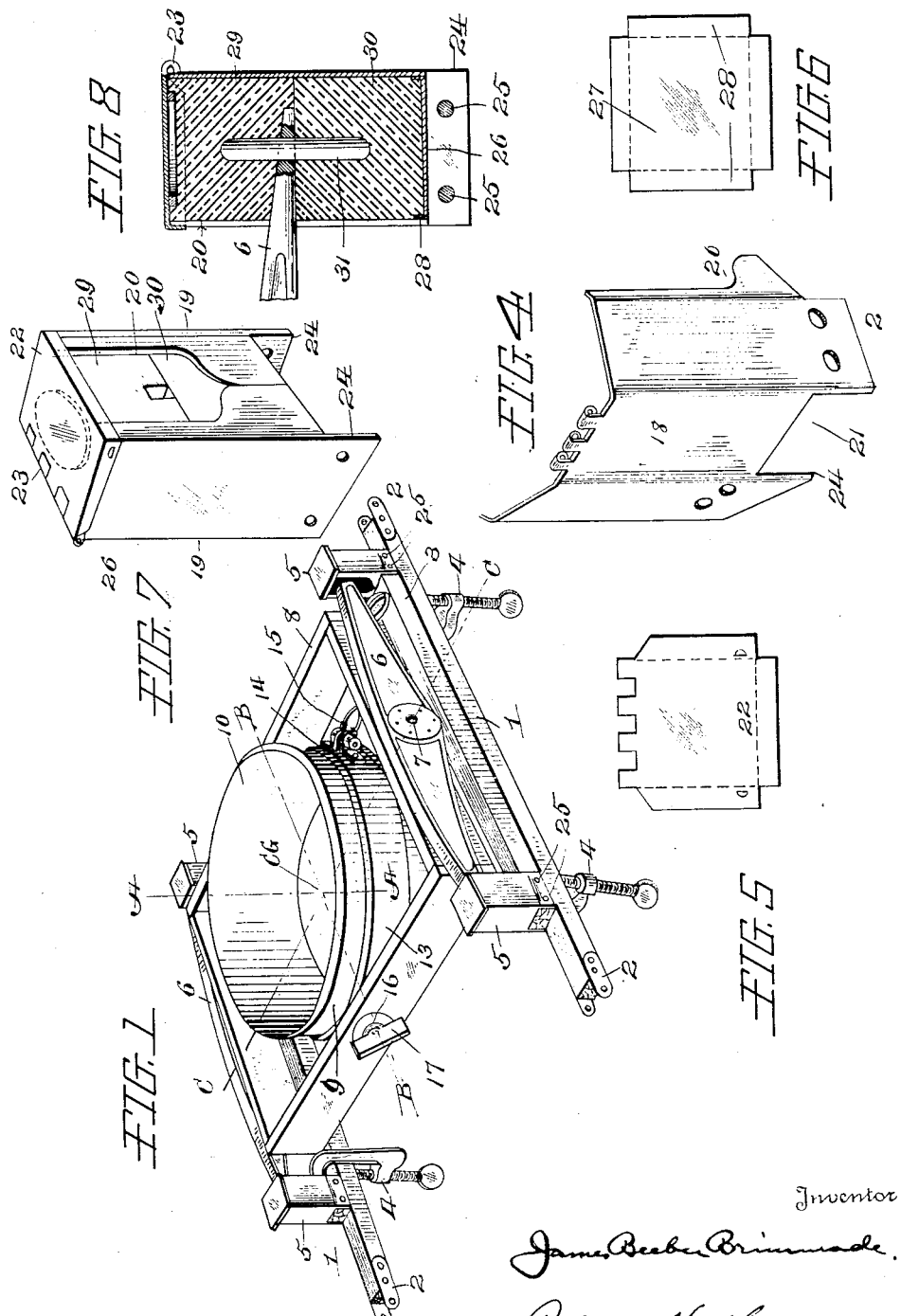

March 31, 1925. 1,531,593
J. B. BRINSMADE
MOUNTING FOR AERIAL CAMERAS
Filed Aug. 1, 1921   3 Sheets-Sheet 2
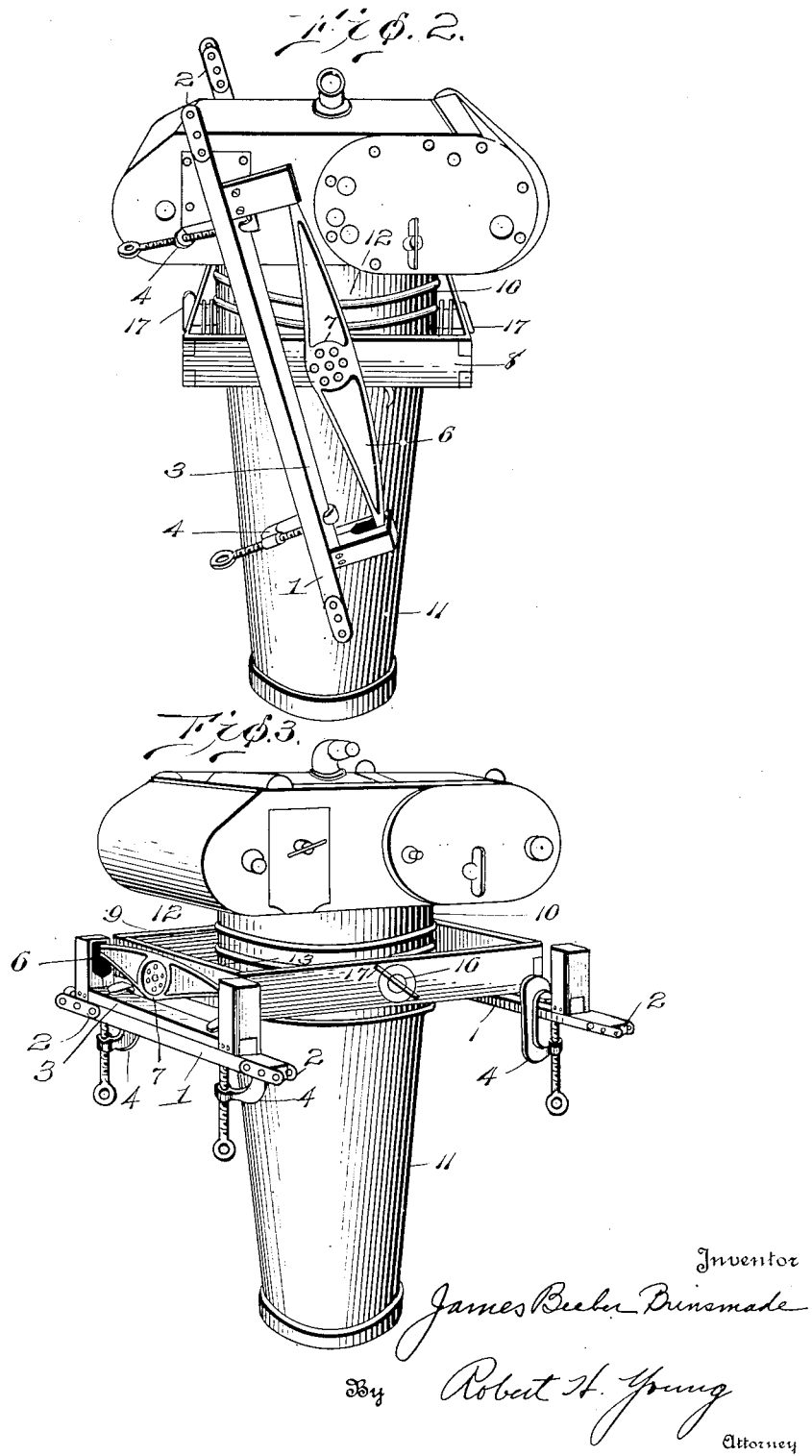
Inventor
James Beeler Brinsmade
By Robert H. Young
Attorney

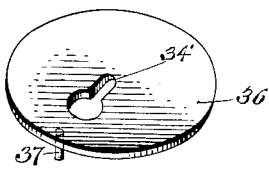
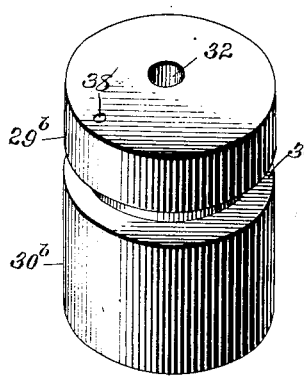
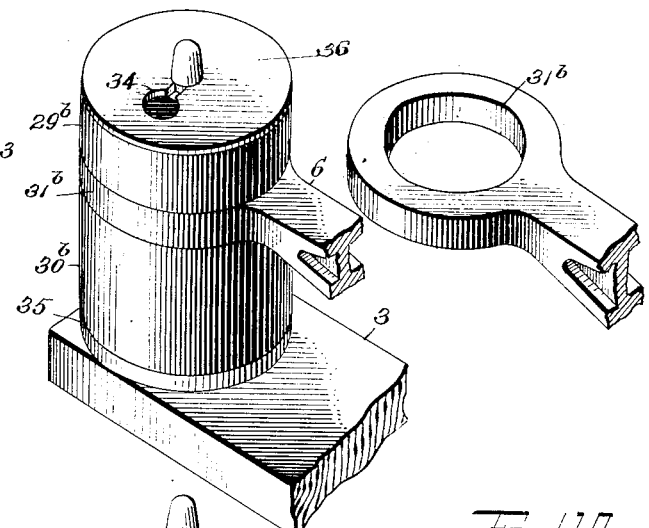
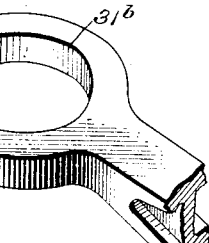
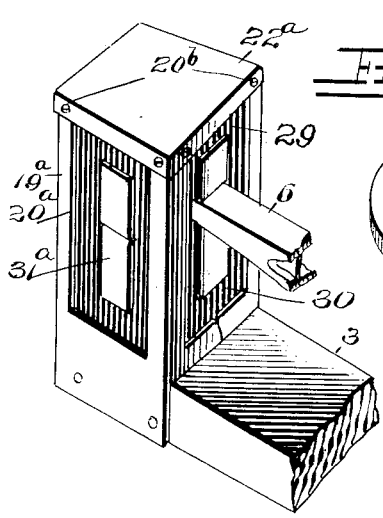
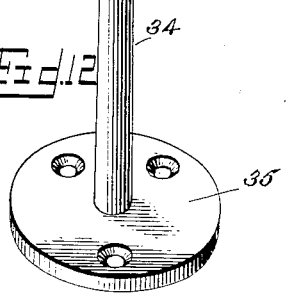
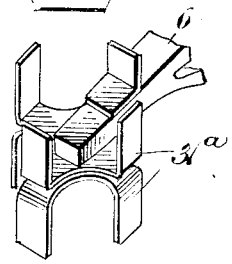

Patented Mar. 31, 1925.

1,531,593

UNITED STATES PATENT OFFICE.

JAMES BEEBER BRINSMADE, OF WILLIAMSTOWN, MASSACHUSETTS.

MOUNTING FOR AERIAL CAMERAS.

Application filed August 1, 1921. Serial No. 489,138.

*To all whom it may concern:*

Be it known that I, JAMES B. BRINSMADE, a citizen of the United States, residing at Williamstown, in the county of Berkshire and State of Massachusetts, have invented certain new and useful Improvements in Mountings for Aerial Cameras, of which the following is a specification.

My invention relates to mountings for aerial cameras, the broad object in view being to produce a camera mounting or support by means of which a photographic camera may be detachably supported on an airplane or an aircraft of any kind and render practicable and convenient the taking of photographs having sharp definition.

One of the main objects of my invention is to provide for easily and quickly adjusting the orientation of the camera by employing a universal mounting in which the camera is supported, said mounting embodying means whereby the camera may be turned on one or more of three separate and distinct axes having a common point of intersection which latter also coincides approximately with the center of gravity of the camera. Suitable clamping means are used to fix the camera in relation to its mounting after proper adjustment has been effected.

Another important object in view is to provide effective means for preventing angular vibration of the camera in order that clear and distinct photographs may be obtained irrespective of the vibration of the fuselage, body or frame of the aircraft and irrespective of the direction in which the camera is pointed. This object is attained by so designing the mounting with reference to the camera for which it is to be used that the above mentioned common point of intersection of the axes of rotation shall coincide approximately with the center of gravity of the camera and by providing shock absorbing members disposed symmetrically about the above mentioned common point of intersection and in a plane passing through this common point.

A further object of the invention is so to design and construct all parts of the mounting that accuracy and quantity production may be obtained.

The invention consists in the novel features herein fully described, illustrated and claimed.

In the accompanying drawings:

Fig. 1 is a perspective view of the complete camera mounting, omitting the camera, but showing the bearers by which said mounting is supported;

Fig. 2 is a perspective view of the complete apparatus showing the camera in its proper relation to the camera mounting and disposed for an approximately horizontal view;

Fig. 3 is a similar view showing the camera in position for a vertical or downwardly facing view;

Figs. 4–8 inclusive give details of the form of shock absorbing members pictured in Fig. 1;

Fig. 4 is an enlarged detail prospective view of a partially bent blank from which the housing of the shock absorber is formed;

Fig. 5 is a plan view of the blank which forms the cover for the housing of the shock absorber;

Fig. 6 is a plan view of the blank from which the bottom of the housing is formed;

Fig. 7 is a perspective view of the complete housing including the cover;

Fig. 8 is a vertical section through the complete shock absorber showing a fragment of one of the floating beams of a gimbal jointed frame;

Figs. 9–10 inclusive show another form of shock absorber;

Fig. 9 is a perspective view of the complete shock absorber showing a fragment of one of the floating beams of a gimbal jointed frame and a fragment of a base member;

Fig. 10 is a perspective view of the anchoring device, shown as attached to a fragment of one of the floating beams of a gimbal jointed frame;

Figs. 11–15 inclusive show a third form of shock absorber;

Fig. 11 is a perspective view of the complete shock absorber showing a fragment of one of the floating beams of a gimbal jointed frame and a fragment of a base member;

Fig. 12 is a perspective view of the supporting member;

Fig. 13 is a perspective view of the resilient member;

Fig. 14 is a perspective view of a fragment of one of the floating beams of a gimbal jointed frame; and Fig. 15 is a perspective view of the cap or cover.

The camera mounting contemplated in my invention is particularly designed with reference to the application thereof to an airplane or any kind of aircraft and to that end, in the drawings, I have illustrated two supporting bearers 1 in the form of straight bars preferably of light wood, said bearers being arranged in spaced parallel relation to each other as best illustrated in Fig. 1 and provided at their opposite extremities with attaching means 2 shown in the form of sets of parallel clips or ears having holes to receive bolts or other fasteners by means of which they may be conveniently secured to the fuselage, body or frame of the aircraft. The bearers 1 form supporting means for the camera mounting hereinafter particularly described and provide for supporting the camera upon the aircraft so that it may be readily placed in position and removed therefrom. Such bearers are in common use on military aircraft for the purpose described and are illustrated merely to indicate the adaptability of my mounting for military and naval purposes.

The mounting for the camera comprises in the present and preferred embodiment thereof a base shown as consisting of base members 3. The members 3 are shown in the form of straight bars preferably of wood or other light material and arranged in spaced parallel relation to each other so as to allow them to rest directly upon the supporting bearers 1 previously referred to, the base members 3 being fastened temporarily to the bearers 1 by means of clamps 4, four of these clamps being shown.

Each of the base members 3 is provided at each end thereof with a shock absorbing member 5 which members support the opposite extremities of a pair of floating beams 6. The beams 6 are arranged directly over the base members 3 and extend parallel thereto and are always out of contact therewith. Mounted between the beams 6 and connected thereto by horizontal pivots or trunnions 7 is a gimbal frame member 8 shown as consisting of a quadrilateral or rectangular open center frame. The pivots or trunnions 7 are arranged directly opposite and in line with each other and at opposite ends or sides of the frame 8. Each of the beams 6 is also shaped so that a straight line joining its ends where they are supported by the shock absorbers 5 will pass through the pivot or trunnion 7.

Mounted within the frame 8 is a camera sling or gimbal ring 9, one surface of which has a fabric facing 10 to obtain a firm frictional hold on camera barrel 11 which is of a type now in common use for aerial photography, said camera being illustrated in Figs. 2 and 3 in its relation to the camera mounting. The camera is formed with a shoulder 12 adapted to set directly against the upper edge of the sling 9, in which position, the center of gravity of the camera coincides, approximately, with the different axes of the camera mounting, thereby providing for the balance of the camera in its mounting and the easy adjustment of the camera for obtaining pictures at any desired angle between vertical and horizontal planes.

Embracing the sling 9 is a clamping and reinforcing band 13 which is split or divided transversely at the point 14 where it is provided with a cam clamp 15 enabling the desired pressure to be applied to the clamping band to confine the sling tightly therein and prevent the camera from rotating or turning. By loosening the clamp 15 the camera may be rotated about its focal axis as the center in order to bring opposite edges of the film or sensitized surfaces parallel to the line of flight of the aircraft, this being necessary when flying in cross winds for example and while making topographical or similar photographs. The sling 9 is pivotally mounted within the frame 8 on pivots or trunnions 16 arranged diametrically opposite each other and shown in the form of winged thumb screws 17, enabling the position of the ring to be fixed when found desirable. It may be noted at this point that the camera is capable of being rotated about three separate and distinct axes, the axis A—A in Fig. 1 representing the focal axis of the camera; the axis B—B representing the axis formed by the pivots or trunnions 16; and the axis C—C representing the axis formed by the pivots or trunnions 7 hereinabove referred to. It will also be noted that all of the axes A—A, B—B and C—C intersect at a given central point C—G the latter being approximately at the center of gravity of the camera.

Each of the shock absorbers 5 may be made up as shown in Figs. 4 to 8, both inclusive, the main body or housing of the shock absorber comprising sheet metal blank 18 as shown in Fig. 4 which is suitably cut and shaped to provide a box shaped holder, said housing being entirely closed on three sides and having a comparatively large orifice 20 in the fourth side, the bottom being cut away and left open as shown at 21 and the housing being temporarily closed at the top by means of a cover or lid 22, the latter being hinged to the main body of the housing at 23. Two opposite sides of the housing 19 are extended to form bottom flanges 24 which lie on opposite sides of the adjacent ends of the respective base members 3 and are securely fastened thereto by fastening means 25. Each housing 19 also comprises a bottom wall 26 formed from the sheet metal blank shown at 27 having upturned flanges 28 which are soldered or otherwise secured to the inner surfaces of the vertical walls of the housing as indicated in Fig. 8. Within each housing 19 are placed upper and lower blocks 29 and 30 of resilient material such as rubber, sponge rubber being preferably employed, and between the said blocks or cushions 29 and 30 there is interposed the adjacent extremity of one of the floating beams 6. Extending through such end of the beam is a normally vertical pin or anchor 31 which projects upwardly and downwardly therefrom into the blocks 29 and 30 as shown in Fig. 8. Another form of shock absorber is shown in Figs. 9 and 10, this being similar to the form just described except that all four vertical sides of the housing have comparatively large orifices 20ᵃ extending to their tops, the covers 22ᵃ instead of being hinged to the body of the housing are provided with suitable catches 20ᵇ at all four corners and the pins 31 are replaced by claw shaped members 31ᵃ, preferably of metal, suitably secured to the ends of the beams 6 and so shaped as to grip the vertical sides of the blocks 29 and 30. Still another form of shock absorber is shown in Figs. 11 to 15, both inclusive. In this form, the upper and lower resilient members 29ᵇ and 30ᵇ are preferably combined into one moulded block of cylindrical shape pierced axially with a hole 32 and provided with an annular groove 33. This resilient member is supported and held in place by a supporting member which thus takes the place of the housing 19 in the form first described. This supporting member consists of a rod 34, preferably of metal, provided with a suitable base plate 35 by which it is attached to the base 3 and held rigidly in a vertical position. This rod 34 fits snugly into the hole 32 in the resilient member. A removable cover or cap 36 is also provided which may be attached to the upper end of the rod 34 by a keyhole 34′ engaging an annular groove 35′ in the rod 34 as shown, or by other well known means, thereby securing the resilient member 29ᵇ—30ᵇ after it has been placed in position on the rod 34. The ends of the beams 6 are formed into a ring shape of such dimensions as to fit snugly into the annular grooves 33 in the resilient members. A pin 37 on the bottom of the cap 36 enters a hole 38 in the member 29ᵇ and holds the parts assembled. It will be noted that this form of shock absorber differs essentially from the form first described only in that this form holds the resilient members in place by means of interior rods or pins and the ends of the beams 6 are anchored by partially enclosing the resilient members, whereas the form first described holds the resilient members in place by partially enclosing them and the ends of the beams 6 are anchored by means of interior pins or rods. By the means just described each of the floating beams 6 has its opposite extremities resiliently anchored and supported, all four extremities of the two beams being approximately in the same geometrical plane which plane also passes approximately through the center of gravity of the camera. Thus the vibrations generated by the aircraft are absorbed and prevented from producing angular vibrations of the camera, thereby insuring photographs free from blurs and having the best possible definition, the latter being essential in topographical and similar photography and also for military and naval purposes.

The floating beams 6, frame 8 and the sling 9 together with the other parts intermediately related thereto form what may be termed a gimbal jointed frame which is interposed between the camera and the supporting base, for the purpose just stated. It will be understood from the foregoing description taken in connection with the accompanying drawings that the camera may be rotated about its focal axis designated by A—A in Fig. 1 for the purpose above stated and that it may also be rotated about the other axes B—B and C—C, all of which axes intersect at a common central point C—G, which last named point is approximately at the center of gravity of the camera in its properly applied position in relation to the camera mounting.

Broadly stated the invention consists of a mounting for aerial cameras having certain features of adjustability enabling the camera to be pointed, sighted or aimed in any desired direction relative to the aircraft and its path of flight, said mounting consisting of one part which is in normally fixed relation to the aircraft and an other part which is in normally fixed relation to the camera, and an interposed gimbal jointed frame with elastic connections to absorb shocks or vibrations between the camera and the aircraft, all of the parts being symmetrically distributed about the center of gravity of the camera and the elastic connections being in a single geometrical plane which passes approximately through the said center of gravity irrespective of the direction, relative to the aircraft, in which the camera is pointed.

While the apparatus is shown as particularly designed for use in connection with a certain well known type of aerial camera, it will be understood that the design may be readily varied to suit other types or makes of aerial cameras. The exact design of the elastic connections is also not confined to the forms shown but may be of any type that will afford resilient support and resilient anchorage in all directions to the floating ends of the gimbal jointed members. The means for attaching the camera mounting to the aircraft may also be varied according to conditions without departing from the scope of the invention as defined in the appended claims.

What I claim is:

1. A mounting for aerial cameras comprising a base, a sling into which the camera is adapted to be fitted and clamped, gimbal jointed members interposed between said base and sling, and shock absorbing elements between the base and corresponding gimbal jointed members.

2. A mounting for aerial cameras comprising a base, shock-absorbing members thereon, a sling in which the camera is adapted to be clamped, and gimbal jointed members supporting said sling and in turn supported by said shock-absorbing members.

3. A mounting for aerial cameras, comprising a base, a sling in which the camera is adapted to be clamped, a gimbal frame supporting said sling and embodying oppositely arranged floating beams, and shock absorbing members on the base supporting the extremities of said floating beams.

4. A mounting for aerial cameras, comprising a base, a sling in which the camera is adapted to be clamped, and a gimbal jointed frame supported by said base and embodying members connected by pivot joints arranged to provide two axes which intersect each other and also intersect the focal axis of the camera, all three axes intersecting at a common point approximately coincident with the center of gravity of the camera.

5. A mounting for aerial cameras comprising a base, a sling in which the camera is adapted to be clamped, and a gimbal jointed frame supported by said base and embodying members connected by pivot joints arranged to provide two axes which intersect each other and also intersect the focal axis of the camera, all three axes intersecting at a common point approximately coincident with the center of gravity of the camera, and resilient shock-absorbing members supporting said frame approximately at four points, said points being symmetrically distributed about said common point of intersection of the axes and said points also lying in a single geometrical plane passing through said common point of intersection.

6. A mounting for aerial cameras, comprising a base, a sling in which the camera is adapted to be clamped, and a gimbal jointed frame supported by said base and embodying members connected by pivot joints arranged to provide two axes which intersect each other and also intersect the focal axis of the camera, all three axes intersecting at a common point approximately coincident with the center of gravity of the camera, and means for clamping said pivot joints in any desired position.

7. A mounting for aerial cameras, comprising a base, a sling in which the camera is adapted to be clamped, and a gimbal jointed frame supported by said base and embodying members connected by pivot joints arranged to provide two axes which intersect each other and also intersect the focal axis of the camera, all three axes intersecting at a common point approximately coincident with the center of gravity of the camera, the sling when relaxed permitting the camera to be rotated on its focal axis.

8. A mounting for aerial cameras, comprising a base, a sling in which the camera is adapted to be clamped, a gimbal frame supporting said sling and embodying oppositely arranged floating beams, and shock-absorbing members on the base supporting the extremities of said floating beams, said shock absorbers embodying resilient cushions and said extremities of the floating beams being anchored to said cushions resiliently in all directions.

In testimony whereof I affix my signature.

JAMES BEEBER BRINSMADE.